United States Patent [19]

Hayes

[11] 4,443,028

[45] Apr. 17, 1984

[54] QUICK COUPLING ASSEMBLY

[75] Inventor: Jerry R. Hayes, Peoria, Ill.

[73] Assignee: L. R. Nelson Corporation, Inc., Peoria, Ill.

[21] Appl. No.: 292,430

[22] Filed: Aug. 14, 1981

[51] Int. Cl.³ .............................................. F16L 37/24
[52] U.S. Cl. ..................................... 285/38; 285/110; 285/306; 285/361; 285/423
[58] Field of Search ................. 285/83, 306, 360, 361, 285/391, 394, 396, 401, 402, 423, 38, 376, 110, 38

[56] References Cited

U.S. PATENT DOCUMENTS

| 1,366,381 | 1/1921 | Gullborg | 285/361 X |
| 1,589,469 | 6/1926 | Homand | |
| 2,819,097 | 1/1958 | Lang | 285/83 X |

FOREIGN PATENT DOCUMENTS

| 255921 | 4/1963 | Australia | 285/376 |
| 761420 | 11/1956 | United Kingdom | 285/376 |

Primary Examiner—Dave W. Arola

[57] ABSTRACT

A three component coupling assembly consisting essentially of plastic male and female coupling members and an annular seal. The female member has a male fitting engaging end portion formed with interior threads for cooperatively threadedly engaging a threaded male hose fitting. The remaining female coupling portion has a generally cylindrical interior periphery of a smaller diameter size defining at a position adjacent the inner end of the interior threads an annular shoulder. The interior periphery has formed therein a plurality of annularly spaced grooves extending from the outer end thereof through the annular shoulder and a corresponding plurality of correspondingly annularly spaced notches extending from the annular shoulder toward the outer end. The seal has an outer annular portion seaingly engaging an uninterrupted outer sealing surface of the shoulder and an inner annular portion extending over the notches and grooves formed in the shoulder. The male member has a female fitting engaging end portion formed with exterior threads and exterior gripping surfaces adjacent the inner end of the exterior threads. The remaining male coupling portion has a plurality of annular spaced lugs on the exterior periphery thereof adjacent the outer end thereof of a size to engage within the grooves and notches and an outwardly facing annular sealing surface on the outer extremity thereof operable when the lugs are engaged inwardly beyond the grooves and engaged within the notches to sealingly engage the inner annular portion of the resilient seal and to resiliently deflect the same in a direction away from the shoulder.

13 Claims, 4 Drawing Figures

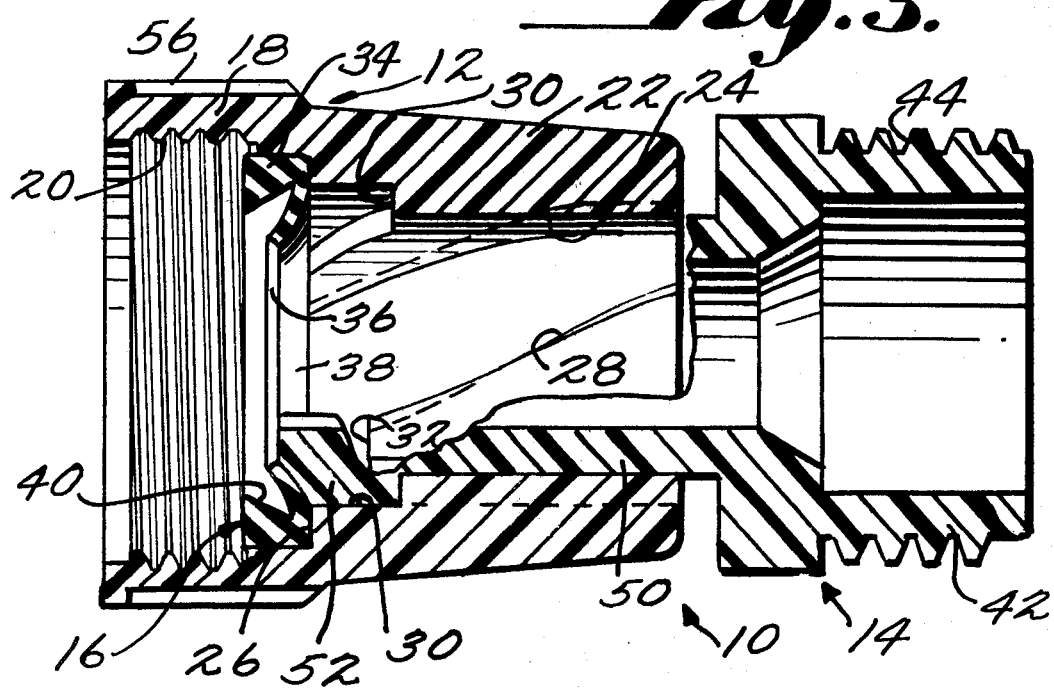
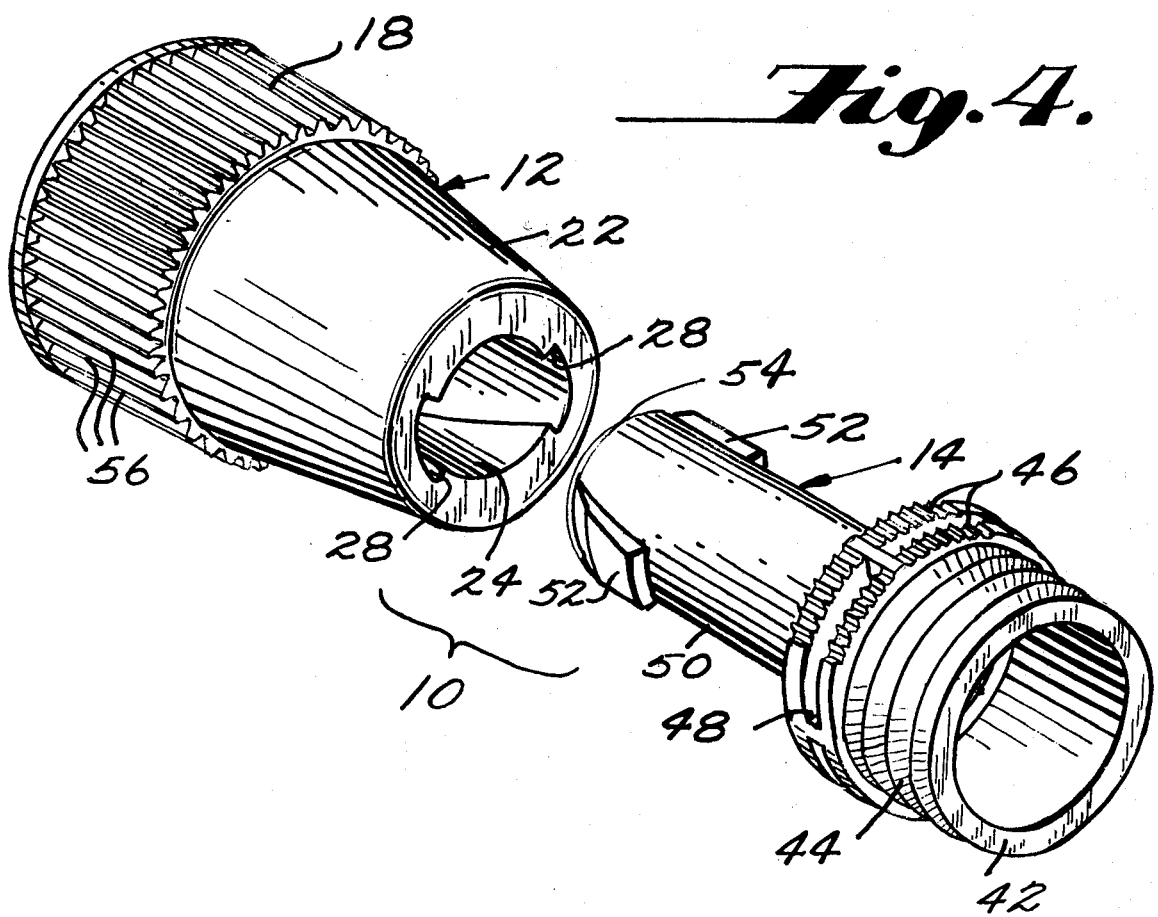

QUICK COUPLING ASSEMBLY

This invention relates to couplings and more particularly a quick coupling assembly for connecting and disconnecting a threaded male hose fitting with a cooperating threaded female fitting with a quick turning action rather than the greater turning action required to connect and disconnect the threaded male and female fittings directly.

Quick coupling assemblies of the type herein contemplated have been commercially available for many years. The commercial assembly in most widespread use is of the type in which the male coupling member includes an exterior annular groove and the female coupling member includes an axially movable sleeve which in a normal position holds a series of balls so that their interior peripheries will engage within the groove and in a release position permits the balls to move radially outwardly. Usually, quick coupling assemblies of this type are made out of brass.

While movable sleeve and ball type quick coupling assemblies are quite effective in operation, they are somewhat expensive. There exists a need for an inexpensive quick coupling assembly which can effectively perform in operation. It is an object of the present invention to provide a quick coupling assembly which will meet that need.

In accordance with the principles of the present invention this objective is obtained by providing a simple three-piece assembly; namely, a female tubular coupling member, a male tubular coupling member and an annular resilient seal. Preferably, the male and female coupling members are molded of a plastic material as, for example, an acetal resin, such as Celcon or Delrin. While the seal may be constructed in the manner of a conventional hose fitting washer, it is preferable to mold the same of an elastomeric material as, for example, synthetic rubber. It is important that the male and female members be minimized in size commensurate with adequate strength to give effective long life operation. In accordance with the principles of the present invention, the female coupling member has a male fitting engaging end portion formed with interior threads on the interior periphery thereof for cooperatively threadedly engaging a threaded male hose fitting. The axial extent of the male fitting engaging end portion is approximately 50% of the pitch diameter of the interior threads. The remaining portion of the female coupling member constitutes a female coupling portion having an axial extent within the range of 75% to 125% of the aforesaid pitch diameter. The female coupling portion has a generally cylindrical interior periphery of a diameter size less than the aforesaid pitch diameter defining at a position adjacent the inner end of the interior threads an annular shoulder facing in a direction toward the interior threads. The interior periphery of the female coupling portion has formed therein a plurality of annularly spaced grooves extending from the outer end thereof through the annular shoulder and a corresponding plurality of correspondingly annularly spaced notches extending from the annular shoulder toward the outer end. The radial extent of the grooves and notches is less than the raidal extent of the shoulder so that the latter includes an uninterrupted outer annular sealing surface. The annular resilient seal has an outer annular portion sealingly engaging the uninterrupted outer sealing surface of the shoulder and an inner annular portion extending over the notches and grooves formed in the shoulder. The male coupling member has a female fitting engaging end portion formed with exterior threads on the exterior periphery thereof and exterior gripping surfaces on the exterior periphery thereof adjacent the inner end of the exterior threads which have a pitch diameter generally the same as the aforesaid pitch diameter. The axial extent of the female fitting engaging end portion being within the range of from 65% to 85% of the aforesaid pitch diameter. The remaining portion of the male coupling member constituting a male coupling portion having an axial extent slightly larger than the axial extent of the female coupling portion within the range of from 85% to 135% of the aforesaid pitch diameter. The male coupling portion has a plurality of annular spaced lugs on the exterior periphery thereof adjacent the outer end thereof of a size to engage within the grooves and the notches and an outwardly facing annular sealing surface on the outer extremity thereof operable when the lugs are engaged inwardly beyond the grooves and engaged within the notches to sealingly engage the inner annular portion of the resilient seal and to resiliently deflect the same in a direction away from the shoulder whereby the resilient seal serves to resiliently bias the lugs into engagement within the notches and hence the coupling members into interlocked relation and to provide an interior seal for both of the coupling members during pressure operation in the interlocked relation.

Another object of the present invention is the provision of a quick coupling assembly of the type described which is simple in construction, economical to manufacture and effective in operation.

These and other objects of the present invention will become more apparent during the course of the following description and appended claims.

The invention can best be understood in conjunction with the accompanying drawings wherein an illustrative embodiment is shown.

In the drawings:

FIG. 3 is a longitudinal sectional view of the assembly with a part of the male coupling member broken away for purposes of clearer illustration; and FIG. 4 is a perspective view of the assembly with the male and female coupling members shown in exploded relation.

Figure 1:
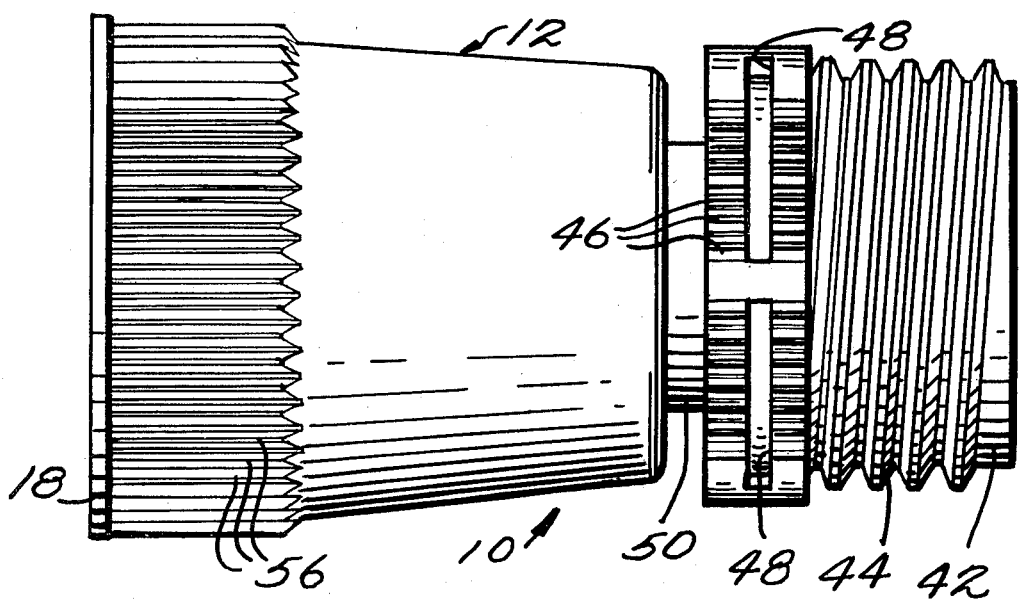
FIG. 1 is a side elevational view of a quick coupling assembly embodying the principles of the present invention.
Figure 2:
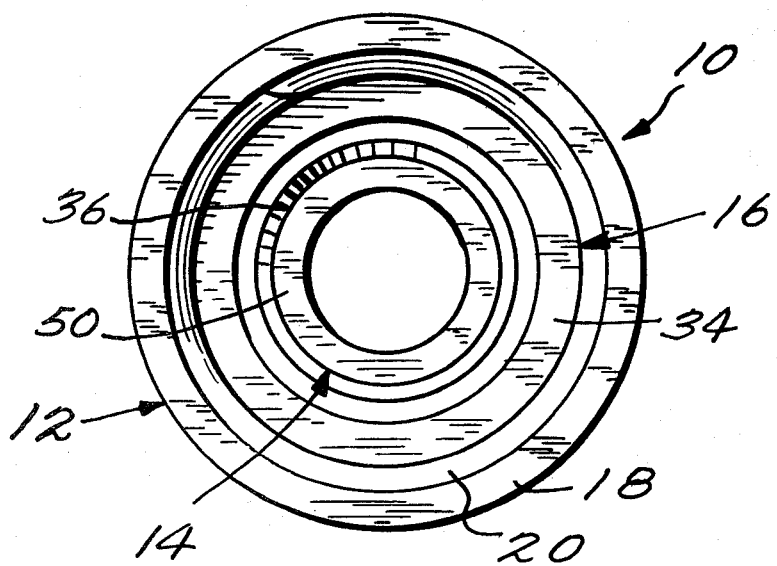
FIG. 2 is an end view looking at the left hand end of the assembly as shown in FIG. 1.

Referring now more particularly to the drawings, there is shown therein a quick coupling assembly generally indicated at 10 which embodies the principles of the present invention. The assembly consists essentially of three components; one, a tubular female coupling member, generally indicated at 12; two, a tubular male coupling member, generally indicated at 14; and three, a resilient annular seal, generally indicated at 16. All three components are preferably formed by molding. The coupling members are molded of a suitable plastic material as, for example, an acetal resin, such as Celcon or Delrin. The seal is molded of an elastomeric material as, for example, synthetic rubber.

The female coupling member 12 includes a male fitting engaging end portion 18 formed with interior threads 20 on the interior periphery thereof for cooperatively threadedly engaging a threaded male hose fitting (not shown) of conventional configuration. The axial extent of the end portion 18 is approximately 50% of the pitch diameter of the interior threads 20. The remaining portion of the female coupling member 12 constitutes a female coupling portion 22 having an axial extent within the range of 75% to 125% of the pitch diameter of the threads 20. In the specific embodiment shown, the preferred axial extent is approximately 100%.

The female coupling portion 22 has an interior cylindrical periphery 24 of a diameter size less than the pitch diameter of the threads 20 so as to define at a position adjacent the inner end of the interior threads 20 an annular shoulder 26 facing in a direction toward the threads 20. The cylindrical interior periphery 24 of the female coupling portion 22 has formed therein a plurality of annularly spaced grooves 28 which extend from the outer end thereof through the annular shoulder 26. While the number of grooves 28 provided may vary, as shown there are two diametrically spaced grooves 28. Preferably, a substantial portion of the grooves 28 are formed into helical configuration. As shown, when viewing the female coupling member 12 from the end thereof opposite the threads 20 and considering a clockwise direction of rotation, the leading side surface defining each groove 28 is helical throughout its axial length. The trailing side surface extends in a purely axial direction for a short distance inwardly from the end of the female coupling portion 22 and then is shaped helically the remainder of the axial distance to the shoulder 26. In addition to the grooves 28, there is formed in the cylindrical surface 24 a corresponding plurality of correspondingly spaced notches 30. As shown, there are two diametrically opposed notches 30 which extend from the shoulder 26 at positions spaced equally between the positions at which the grooves 28 meet the shoulder. The portion of the cylindrical interior periphery 24 adjacent the shoulder 26 which extends between the leading side surface of each groove to the trailing side surface of each of notches 30 is relieved as indicated at 32. Each notch 30 therefore is defined by a leading side wall surface 57 of helical configuration which extends from the bottom of the notch to the shoulder 26 and a short straight axially extending trailing side wall 58. It is noted that the radial extent of the grooves 28, notches 30 and recesses 32 are the same and less than the radial extent of the shoulder 26 so that the latter includes an uninterrupted outer annular sealing surface for receiving in sealing relation the annular seal 16.

As best shown in FIG. 3, the annular seal 16 includes a relatively thick outer annular portion 34 and an integral relatively thin inner annular portion 36. The annular seal 16 is shown in cross-section in FIG. 3 in a flexed condition. In its normal unflexed condition, the annular seal has a configuration which includes a radially extending inwardly facing surface 38 which is common to both the inner portion 36 and the outer portion 34. The relatively thin inner portion 36 is defined along its interior by a cylindrical interior surface and along its outwardly facing portion by a radially extending surface parallel with the surface 38. Similarly, the exterior of the outer annular portion 34 is defined by a cylindrical exterior peripheral surface and the outer portion thereof is defined by a radial surface parallel with the surface 38. As shown, the interior of the outer annular portion 34 is defined by a frusto-conical surface 40 which diverges inwardly from the interior periphery of the outwardly facing radial surface thereof.

The male coupling member 14 includes a female fitting engaging end portion 42 formed with exterior threads 44 on the exterior periphery thereof and exterior gripping surfaces 46 on the exterior periphery thereof adjacent the inner end of the exterior threads 44. It will be understood that the gripping surfaces 46 may assume any desired configuration. However, as shown, they are in the form of a series of ridges included within an enlarged section of the end portion 42 which, for the sake of material saving, has a series of segmented grooves 48 formed therein. As shown, there are two series of ridges 46 displaced 180° from each other with each series extending approximately 90°.

The end portion 42 of the male coupling member 14 has a length or axial extent which is within the range of from 65% to 85% of the pitch diameter of the exterior threads 44, the latter being generally the same as the pitch diameter of the interior threads 20. The remaining portion of the male coupling member 14 constitutes a male coupling portion 50 having an axial extent slightly larger than the axial extent of the female coupling portion 22 within the range of from 85% to 135% of the pitch diameter of the threads 20 or 44. A preferred length, as shown, is 110%.

Formed on the exterior periphery of the male coupling portion 50 near the outer end thereof is a plurality of annularly spaced lugs 52. The number of lugs corresponds with the number of grooves 28 so that in the preferred embodiment shown, there are two lugs 52 provided. Likewise, the annular spacing of the lugs 52 corresponds with the spacing of the annular grooves 28 and the notches 30 so that they are positioned in diametrically opposed relation with respect to one another. The radial extent of the lugs 32 generally is equal to or slightly less than the radial extent of the grooves 28 and notches 30 and the side surfaces thereof when considered in a manner similar to that previously described with respect to the grooves 28 provide leading side surfaces 57 of helical configuration and trailing side surfaces 58 which are axially straight.

In operation, the female coupling member 12 is connected with a threaded male hose fitting (not shown) by turning the interior threads 20 onto the threaded male hose fitting until the end of the hose fitting engages the outwardly facing surface of the outer annular portion 34 of annular seal 16. To facilitate the threaded engagement of the female coupling member 12, a series of axially extending gripping ridges 56 are formed on the exterior periphery of the female coupling member 12 in axially co-extensive relation with respect to the end portion 18 thereof. It is noted that the exterior periphery of the female coupling portion 22 is preferably of frusto-conical configuration as shown.

The male coupling member 14 is connected with a threaded female fitting (not shown) which is provided on various instrumentalities normally connectable with the end of the hose such as water sprinklers, nozzles, and other hose sections. Here again, this connection is effected simply by turning the male coupling member 14 with respect to the threaded female fitting so as to engage the threads 44 therein. Gripping surface 46 provides operator assistance in effecting this turning action. Normally, the end of the portion 42 will engage a conventional washer (not shown) carried by the female fitting which effects the required seal.

It will be understood that advantageously the assembly 10 will be used such that a single female coupling member 12 connected on a hose end is provided to cooperate with a plurality of male coupling members 14 connected as aforesaid to a number of different instrumentalities of the type previously mentioned. Once the male and female coupling members have been mounted in the manner described, it then becomes a simple matter to effect connection of any one of the instrumentalities having a male coupling member 14 connected therewith to the end of a hose having the female coupling member 12 connected therewith. In this regard, it will be noted that when the female coupling member 12 is connected to the hose in a condition to receive the male coupling member 14, the relatively thin inner annular portion 36 of the annular seal 16 is disposed in an unflexed condition wherein the surface 38 thereof which is common to the outer portion 34 extends in the radical plane of the shoulder 26.

The male coupling member 14 is connected with the female coupling member 12 by simply engaging the lugs 52 within the outer ends of the grooves 28. As the lugs move axially through the grooves, the trailing side surfaces of the lugs and grooves interengage and due to the helical configuration of the side surface of the grooves, a slight turning action is imparted to the male coupling member 14. This slight turning action gives an indication to the operator who is gripping the male coupling member that it is necessary to give the male coupling member a slight twist in order to engage the same in locked relationship with respect to the female coupling member 12. It will be noted that as the lugs 52 are moved inwardly with respect to the grooves 28, the end of the male coupling portion 50 will engage the inner annular portion 36 of the annular seal 16 so that further inward movement of the lugs 52 results in the seal portion 36 flexing in a direction toward the threads 20 into engagement with frusto-conical surface 54. When the lugs have been extended as far inwardly as possible as determined by the end of the female coupling member engaging the confronting end of the end portion 42, the lugs will be disposed inwardly of the recesses 32 so that by effecting a turning action of approximately ¼ turn, the helical leading side surfaces of the lugs 52 will engage the leading helical side surfaces of the notches 30. When the male coupling member is released the resiliency of the flexed inner annular portion 36 of the seal 16 will bias the lugs 52 axially into engagement within the notches 30 where the trailing axial side surfaces of the lugs engage the trailing axial side surfaces of the notches to retain the members in resiliently biased interlocked relation.

In this interlocked relation the flexed inner annular seal portion 36 sealingly engages the frusto-conical sealing surface 54 of the male coupling portion 50 to provide an effective seal between the two coupling members. Note also that operating pressure serves to enhance the seal as well as to increase the bias of the members into their interlocking relation. It will be understood that the two members are disconnected by reversing the connecting procedure noted above.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A quick coupling assembly for connecting and disconnecting a threaded male hose fitting with a cooperating threaded female fitting with a quick turning action rather than the greater turning action required to connect and disconnect the threaded male and female fittings directly comprising:

a tubular female coupling member having a male fitting engaging end portion formed with interior threads on the interior periphery thereof for cooperatively threadedly engaging a threaded male hose fitting, the axial extent of said male fitting engaging end portion being approximately 50% of the pitch diameter of said interior threads, the remaining portion of said female coupling member constituting a female coupling portion having an axial extent within the range of 75% to 125% of said pitch diameter, said female coupling portion having a generally cylindrical interior periphery of a diameter size less than said pitch diameter defining at a position adjacent the inner end of said interior threads an annular shoulder facing in a direction toward said interior threads, the interior periphery of said female coupling portion having formed therein a plurality of annularly spaced grooves extending from the outer end thereof through said annular shoulder and a corresponding plurality of correspondingly annularly spaced notches extending from said annular shoulder toward said outer end, the radial extent of said grooves and notches being less than the radial extent of said shoulder so that the latter includes an uninterrupted outer annular sealing surface, an annular resilient seal having an outer annular portion sealingly engaging the uninterrupted outer sealing surface of said shoulder and an inner annular portion extending over the notches and grooves formed in said shoulder, and a tubular male coupling member having a female fitting engaging end portion formed with exterior threads on the exterior periphery thereof and exterior gripping surfaces on the exterior periphery thereof adjacent the inner end of said exterior threads, said exterior threads having a pitch diameter generally the same as the aforesaid pitch diameter;

the axial extent of said female fitting engaging end portion being within the range of from 65% to 85% of said pitch diameter, the remaining portion of said male coupling member constituting a male coupling portion having an axial extent slightly larger than the axial extent of said corresponding female coupling portion, said male coupling portion having a plurality of annular spaced lugs on the exterior periphery thereof adjacent the outer end thereof of a size to engage within said grooves and said notches and an outwardly facing annular sealing surface on the outer extremity thereof operable when said lugs are engaged inwardly beyond said grooves and engaged within said notches to sealingly engage the inner annular portion of said resilient seal and to resiliently deflect the same in a direction away from said shoulder whereby said resilient seal serves to resiliently bias said lugs into engagement within said notches and hence said coupling members in interlocked relation and to provide an interior seal for both of said coupling members when in said interlocked relation.

2. A quick coupling assembly as defined in claim 1 wherein a substantial inner portion of said grooves is of shallow helical configuration so that when the lugs on said male coupling portion are moved inwardly along said grooves, the helical configuration thereof causes the male coupling member to turn slightly with respect to said female coupling member thereby indicating to the user a reminder that a final twisting action must be applied, in order to engage the lugs within said notches.

3. A quick coupling assembly as defined in claim 2 wherein said notches are defined on one side by a generally radially extending surface and on the other by a surface which diverges with respect to said radial notch surface in an outward direction and said lugs are defined on one side by generally radially extending surface and on the other by a surface which diverges with respect to said radial lug surface in an outward direction, the radially extending surfaces of said lugs and notches being interengaged when said members are in said interlocked relation so as to prevent turning in an unlocking direction without an initial axially inward movement.

4. A quick coupling assembly as defined in claim 3 wherein the sealing surface on the outer end of said male coupling portion is of frusto-conical configuration and faces outwardly both axially and radially.

5. A quick coupling assembly as defined in claims 1, 2, 3, or 4 wherein said annular seal is formed with said inner annular portion having a thickness substantially less than the thickness of said outer annular portion.

6. A quick coupling assembly as defined in claim 5 wherein said annular seal in an unflexed condition includes a radially extending inwardly facing surface common to both inner and outer annular portions thereof, the inner annular portion of said seal having a cylindrical interior surface and an outwardly facing radially extending surface, the outer annular portion of said seal having a cylindrical exterior surface, an outwardly facing radially extending surface and a frusto-conical interior surface diverging inwardly from the interior periphery of the outwardly facing surface thereof.

7. A quick coupling assembly as defined in claim 6 wherein the minor diameter of said frusto-conical surface is adjacent the outwardly facing surface of said outer seal portion.

8. A quick coupling assembly as defined in claim 1 wherein the exterior surface of said female coupling member is formed with a series of ridges extending axially generally throughout the axial extent of said male fitting engaging end portion and a frusto-conical configuration converging therefrom to the opposite end thereof.

9. A quick coupling assembly as defined in claims 1, 2, 3, 4 or 8 wherein said female coupling member is molded of high impact polyester.

10. A male coupling member and a female coupling member, said male coupling member being operable to form a part of a quick couling assembly for connecting and disconnecting a threaded male hose fitting with a cooperating threaded female fitting with a quick turning action rather than the greater turning action required to connect and disconnect the threaded male and female fittings directly said tubular female coupling member having a male fitting engaging end portion formed with interior threads on the interior periphery thereof for cooperatively threadedly engaging a threaded male hose fitting, the axial extent of said male fitting engaging end portion being approximately 50% of the pitch diameter of said interior threads, the remaining portion of said female coupling member constituting a female coupling portion having an axial extent within the range of 75% to 125% of said pitch diameter, said female coupling portion having a generally cylindrical interior periphery of a diameter size less than said pitch diameter defining at a position adjacent the inner end of said interior threads an annular shoulder facing in a direction toward said interior threads, the interior periphery of said female coupling portion having formed therein a plurality of annularly spaced grooves extending from the outer end thereof through said annular shoulder and a corresponding plurality of correspondingly annularly spaced notches extending from said annular shoulder toward said outer end, the radial extent of said grooves and notches being less than the radial extent of said shoulder so that the latter includes an uninterrupted outer annular sealing surface, said female coupling member carrying an annular resilient seal having an outer annular portion sealingly engaging the uninterrupted outer sealingly engaging the uninterrupted outer sealing surface of said shoulder and an inner annular portion extending over the notches and grooves formed in said shoulder, said male coupling member comprising a tubular member having a female fitting engaging end portion formed with exterior threads on the exterior periphery thereof and exterior gripping surfaces on the exterior periphery thereof adjacent the inner end of said exterior threads, the axial extent of said female fitting engaging end portion being within the range of from 65% to 85% of said pitch diameter, the remaining portion of said male coupling member constituting a male coupling portion having an axial extent within the range of from 85% to 135% of said pitch diameter, said male coupling portion having a plurality of annular spaced lugs on the exterior periphery thereof adjacent the outer end thereof of size to engage within the grooves and the notches of the female coupling member and an outwardly facing annular sealing surface on the outer extremity thereof operable when said lugs are engaged inwardly beyond the grooves and engaged with the notches to sealingly engage the inner annular portion of the resilient seal and to resiliently deflect the same in a direction away from the shoulder.

11. A male coupling member as defined in claim 10 wherein said lugs are defined on one side by a generally radially extending surface and on the other by a surface which diverges therefrom in an outward direction.

12. A male coupling member as defined in claim 11 wherein the sealing surface on the outer end of said male coupling portion is of frusto-conical configuration and faces outwardly both axially and radially.

13. A male coupling member as defined in claims 10, 11 or 12 wherein said tubular member is molded of acetal resin.

* * * * *